United States Patent Office 3,460,451
Patented Aug. 12, 1969

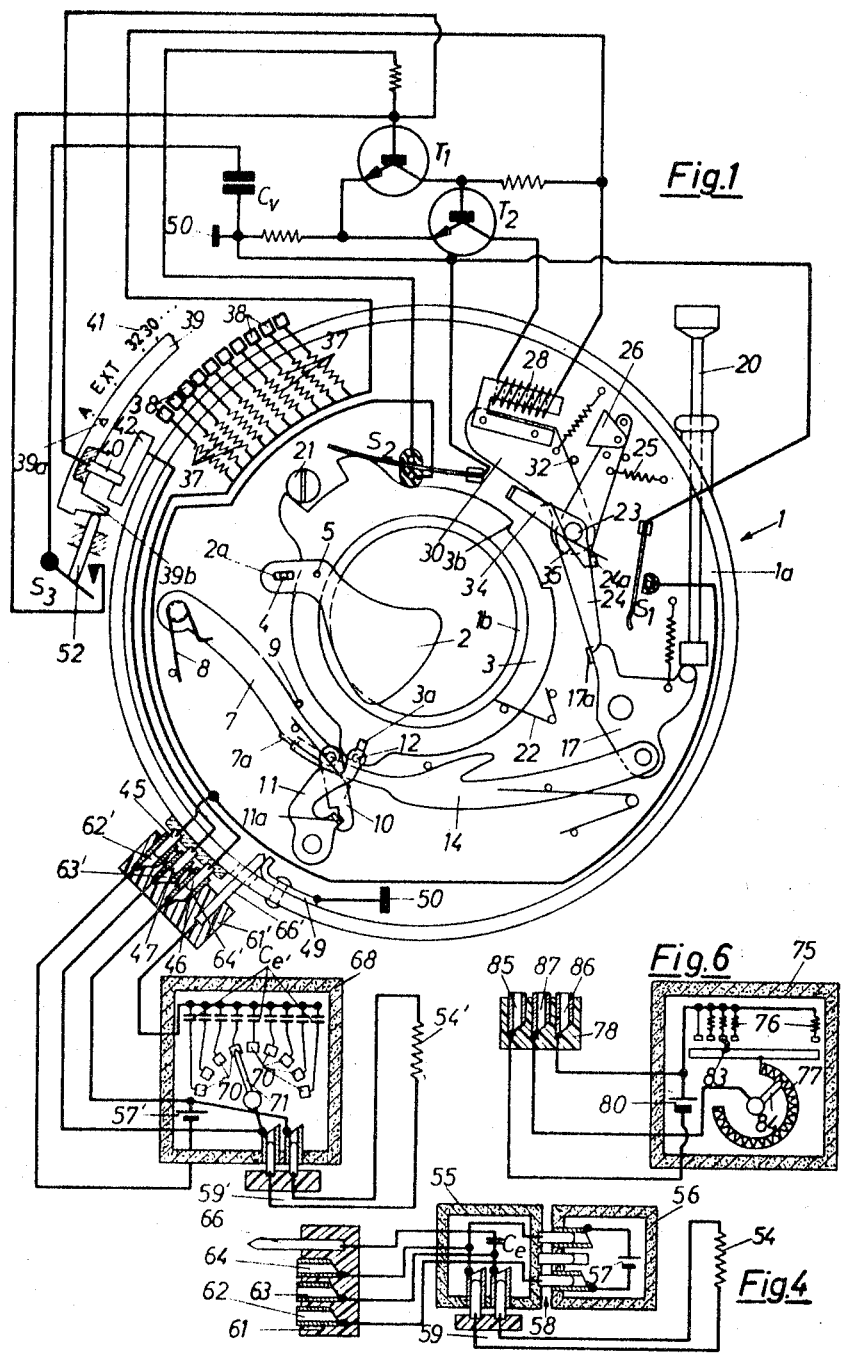

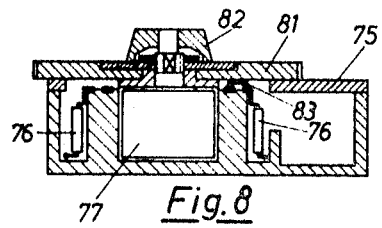
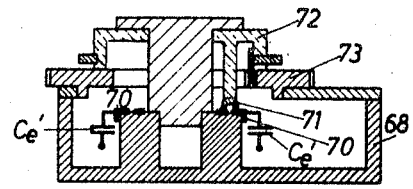
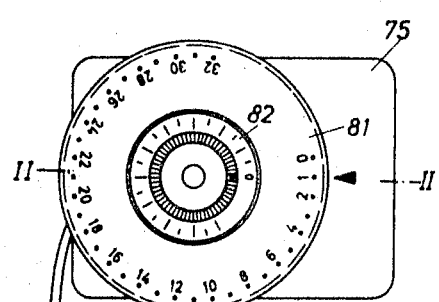
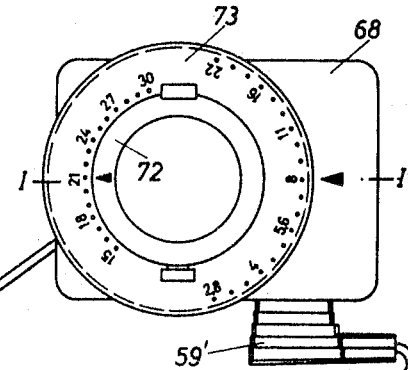
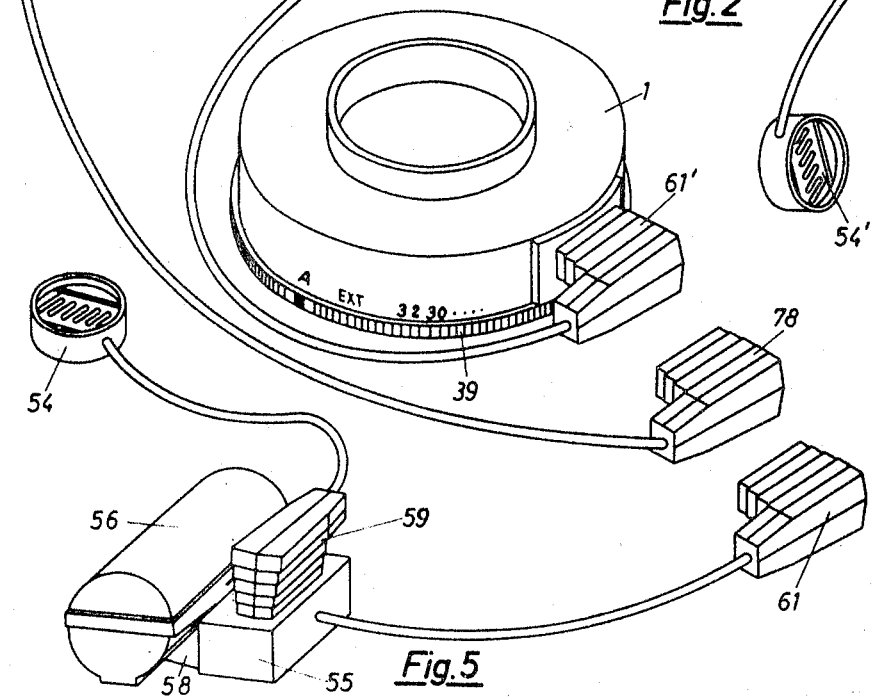

3,460,451
PHOTOGRAPHIC SHUTTER WITH AN
ELECTRONIC TIMING DEVICE
Franz W. R. Starp and Dieter Rittmann, Calmbach,
Black Forest, Germany, assignors to Prontor-Werk
Alfred Gauthier, G.m.b.H., Calmbach, Black Forest,
Germany, a corporation of Germany
Filed Mar. 6, 1967, Ser. No. 620,860
Claims priority, application Germany, Mar. 5, 1966,
P 38,908
Int. Cl. G01j 1/52
U.S. Cl. 95—10                                 14 Claims

ABSTRACT OF THE DISCLOSURE

This invention relates to a photographic shutter with an electronic timing device having time-determining resistance and capacitance disposed therein. A switch is disposed in the circuit of the electronic timing device between the capacitance and a transistor for the electrical timing device, and a selector having a contact member electrically connected to the resistance is provided for setting various resistance values. The selector is movable to an automatic position disconnecting the contact member from the resistance and engaging the switch to disconnect the capacitance. Additionally, a photoresistor and a capacitor tuned to the photoresistor is mounted on a housing connectable to the shutter for inclusion in the circuit of the electronic timing device. The contact member of the selector is adapted to electrically engage the photoresistor when the selector is in the automatic position.

---

The invention relates to a photographic shutter with an electronic timing device having time-determining resistance-capacitance members disposed in the shutter housing which are adjustable to various resistance values by means of a manually operable setter and equipped with a slide contact.

Photographic shutters with an electronic timing device of the above type are distinguished particularly by a wide range of exposure times such as from 1/125 sec. to a full 32 seconds. Setting the desired exposure time may be accomplished in shutters of this kind, by a manually operable setter which carries a slide contact, by means of which one of a plurality of resistors disposed in the shutter, to bring about the desired exposure time, is switched into the circuit of the electronic timing device. To make it possible to apply a shutter specifically geared to the needs of cameras for professional photography in a highly economical and purposeful manner, it is an object of this invention to make the time regulating resistors of the electronic timing device so as to be excludable and to include in their place a resistor combination composed of several gradated fixed resistors and a continuously variable resistor which bridges the jumps in the resistance values of the fixed resistors. This measure made it possible to create the conditions which allow the use of a camera equipped with an electronic timing device after it has been set to a special working range designated EXT, for external, even when extraordinarily high demands are made on the shutter regarding the accuracy of the exposure time even when it may be desired to have setting of intermediate values of a time scale. This applies, for example, to photographs taken to make studio color photos for advertising purposes and the like.

To further expand the possibilities of using a camera equipped with such a shutter toward the end of enabling not only photographs with a preselected time to be taken but, beyond this, to also take automatic light-controlled photographs as well as true exposure time formation photographs while retaining the given shutter concept. This invention provides that the resistance-capacitance members disposed in the shutter housing be adapted to be switched off and in their place a photoresistor as well as a capacitor tuned to its resistance characteristic are provided that are adapted to be switched on, both of which may be accommodated on one housing or two separate housings. This makes it possible, not only to open up new fields of application for a camera equipped with an electronic shutter of the above described type but, beyond this, by adding in the AUTO range resistance-capacitance members readily tunable to each other, it is possible to create the conditions which will guarantee that true exposure times actually corresponding to the prevailing lighting conditions are achieved even when the exposure time formation is light-controlled and automatic. To accomplish this it is merely necessary to switch the shutter to the working range designated A for AUTO, and to attach an accessory comprising a photoresistor as well as a capacitor.

Low-ohmic resistors may be used in electronic shutters for the purpose of time determination and time formation. The reason for this can be found in the fact that low-ohmic resistors may be of small dimensions and consequently can be accommodated more easily, in the numbers desired, for a far-reaching time determination in the rather limited assembly space usually available in a shutter housing. However, low-ohmic resistors require the use of a capacitor of relatively high capacity which, measured by the restricted assembly space usually available, has relatively large dimensions. Nevertheless, the above described combination of resistance-capacitance members has generally been preferred in the development of electronic time forming devices for photographic cameras, based on the recognition that one capacitor is generally adequate for time regulation in electronic shutters, whereas resistors are always required in more or less large numbers.

One could control a shutter with electronic timing device of the above kind as a function of the lighting condition by restricting oneself to adding merely the photoresistor to the circuit of the timing device in place of the resistors housed in the shutter housing. But this would presuppose the selection of a photoresistor which matches, with respect to its resistance characteristic, the capacitor of high capacity remaining in the circuit. The selection of the photoelectric cell would thus be limited to a low-ohmic model which is unsuited for the intended purpose for various reasons. This is also the reason why photoresistors with high ohmic value are used almost exclusively in photographic shutters with exposure control depending on lighting conditions. Further the fact that high-ohmic photoresistors have a pronounced linear characteristic curve must be considered. A high-ohmic photoelectric cell, however, presupposes the use of a capacitor of relatively low self-capacitance so that, from an electrical viewpoint, the most favorable conditions result when changing a camera, with an electronic timing device and preselectable exposure time, over to an automatic exposure time setting both the resistors and capacitor are taken out of the circuit of the timing device and another capacitor, readily adaptable to the resistance characteristic of the high-ohmic photoelectric cell is introduced into the circuit in its place.

According to the invention, a structurally simple design of a device serving the change-over of the shutter to the automatic range, particularly advantageous from the standpoint of both function and handling is achieved when the time preselection setter can be set to an A position to switch off the capacitor disposed in the shutter housing and to switch on the photoresistor. This action occurs as the preseletion setter actuates a switch which interrupts the electrical connection between the capacitor and a transistor of the electronic timing device and the slide contact of the time preselection setter is brought into contact-making position with a contact plate in electrical connection with the photoresistor. The connection with the capacitor tuned to the photoresistor is accomplished by means of a separate contact pin.

According to another feature of the invention it is further proposed that the photoresistor, accommodated in a separate housing, and the capacitor tuned to the photoresistor, accommodated in an additional housing, be electrically connectable by means of plug-in cables or the like. Additionally, the housing accommodating the capacitor may be likewise attachable by means of an additional plug-in cable to a plug receptacle provided at the shutter housing. This allows the photoresistor to be directed toward the object to be photographed, regardless of the respective position of the housing enclosing the capacitor or of the shutter housing itself. This simple design of an accessory serving to set the exposure time automatically permits taking into account, if there is a need for it, exposure factors such as $f$-stop and film sensitivity by optical means in the ray path of the photoresistor. According to the invention, the arrangement for the same purpose can also be such that several capacitors of various capacities may be provided in a housing, so that one capacitor can be included into the circuit of the electronic timing device at any one time by means of a selector switch. This design enables exposure factors such as $f$-stop, film sensitivity etc. to be programmed directly in the circuit of the electronic timing device.

An arrangement meeting both the functional and operational requirements to the utmost for attaching an accessory to the shutter for automatic exposure time setting consists, according to a further proposal of the invention, providing a plug connection which has, besides two contact points serving to supply voltage, a third contact point which electrically connects both the photoresistor and the capacitor to the circuit of the electronic time forming device and which also carries an additional contact pin provided to electrically connect the capacitor or capacitors with the mass of the shutter housing, whereby the latter is connected to the minus potential of the voltage source by means of the switch automatically actuated when the shutter is released.

It is further provided in another advantageous development of this invention to have a four pole plug connection serving to connect the photoresistor to the shutter housing side and the capacitor assigned to it. To construct a plug connection that is sturdy and also as easy to handle as possible, the contact points of the plug of the plug connection at the housing side can be designed, according to a further embodiment of the invention, partly as sleeve and partly as pin, which are adapted to cooperate with matching counter parts at the shutter side.

Various other objects, features and advantages of this invention will be apparent from the following specification, claims and the drawings appended hereto wherein:

FIG. 1 is a partially diagrammatic view illustrating the shutter of this invention with an electronic timing device having the cover plate removed, and with the operating parts shown in their normal position.

FIG. 2 is a perspective view of the shutter and accessory shown in FIG. 1.

FIG. 3 is a cross-sectional view of the accessory attachable to the shutter of FIGURE 1, along line I—I in FIG. 2.

FIG. 4 is a cross-sectional, partially diagrammatic view of an accessory, includable into the circuit of the electronic timing device of the shutter of FIGURE 1.

FIG. 5 is a perspective view of the accessory shown in FIG. 4.

FIG. 6 is a cross-sectional, partially diagrammatic view of another accessory connectable to the electronic timing device of FIGURE 1, to set intermediate exposure time values.

FIG. 7 is a perspective view of the accessory shown in FIG. 6.

FIG. 8 is a cross-sectional view of the accessory of FIGURE 6 along line II—II of FIG. 7.

Referring now to the drawings a housing of a photographic shutter, generally designated by the numeral 1, in the form of a self-winding shutter, has a housing base 1a provided with a concentric tube nipple 1b for mounting an actuating ring 3 serving to drive several shutter blades 2, only one of which is shown. Each shutter blade 2 is guided by means of a pin-slot connection 4 and 2a and is rotatably mounted on a pin 5 of actuating ring 3.

A drive system is provided to impart a back and forth rotary motion to ring 3 and has a rotatably mounted drive lever 7 which, in normal position, rests against a stationary pin 9 under the influence of a drive spring 8. Linked to the free end of drive lever 7 is a transport pawl 10 which, in turn, cooperates with a bent tab 11a of a rotatably mounted intermediate lever 11 which engages the actuating ring 3 through a pin-slot connection 12 and 3a.

To bring the drive lever 7 into wound position, a trust pawl 14 is provided, which is linked at one end to a rotatably mounted winding and release member 17, and has the face of its other end resting against a tab 7a of the drive lever during the winding motion. The winding and release member 17 may be actuated, for example, by means of a release plunger 20 guided in shutter housing 1. A stationary stop 21 serves to limit the rotary motions of the actuating ring 3 while a spring 22 locks the ring 3 in the closed position during the winding process.

To achieve various exposure times, the mechanical shutter blade drive is influenceable, during the exposure run-off, by an electronic timing device. This device has a two-armed actuating lever 24 which is mounted on a stationary pin 23, one end of which is in engagement with a driving tab 17a of the winding and release member 17 under the force of a return spring 25, while its other end carries a magnet armature 26 which cooperates with an electromagnet 28. An oblique upper edge formed at the driving tab 17a serves to enable the winding and release member 17 to return into its starting position even though the actuating lever 24 has already reassumed its normal position. As may be further seen from FIG. 1, the electromagnet 28 is disposed on a plate 30 which is expediently mounted so that it can pivot coaxially with the actuating lever 24 and which is biased against a stationary pin 32. Additionally a locking lever 34 is mounted on the pin 23 and is biased against a drive tab 24a of actuating lever 24 due to a wound spring 35 and is adapted to drop in ahead of edge 3b of actuating ring 3 in the open position of shutter blades 2, thus blocking the run-off of the mechanical drive system for the duration of the exposure time.

With regard to the aforementioned electronic timing device, it can be designated in a manner known as an emitter-coupled trigger circuit comprising two transistors $T_1$ and $T_2$, a capacitor $C_v$ and a number of fixed resistors 37, gradated with respect to their ohmic values. Each of the fixed resistors 37 is electrically connected to a contact plate 38 and can be included into the circuit of the electronic timing device by means of a contact slide 40 which is mounted on a time preselector 39 so as to be insulated and connected to the base potential of the control transistor $T_1$. A contact switch $S_1$ is provided for the purpose of applying a voltage to the electronic timing device during the shutter winding process shortly before the actuating lever 24 causes the armature 26 to contact the electromagnet 28. Further associated with the electronic switching device is a reversing switch $S_2$, influenceable by the shutter blade actuating ring 3. The switch $S_2$ has two contact pins and is so laid out that it short-circuits the capacitor $C_v$ in the normal position as illustrated in FIG. 1, i.e., when the upper pin is in contact-making position. The capacitor $C_v$ is charged after reversal, and during the reversing process, the contact tongue of switch $S_2$ makes contact with the lower pin, thus paralleling switch $S_2$ to switch $S_1$.

It is evident from FIG. 1 that the time preselector 39 carries a mark 39a, in addition to a contact slide 40, by means of which the selector can be set opposite a stationary exposure time scale 41 indicated on the drawing. According to the numerical values of setting scale 41 shown here, provisions are made for achieving exposure times in the manual setting range in the order from a full 32 seconds down to $\frac{1}{125}$ of a second with the electronic timing device.

As may be seen from the drawing, in addition the time preselector 39 is adjustable for two other positions marked EXT and A. This for the purpose of making it possible, with the accessories described below in greater detail, to take pictures with continuously variable exposure time setting in the EXT working range and with light-controlled, automatic exposure time formation with the aid of a photocell such as a photoresistor in the A working range. In the two specific settings EXT and A, the contact slide rests against a contact plate 42 disposed as a continuation of contact plates 38 in shutter housing 1. The fixed resistors 37 assigned to time scale 41 are, for this case, separated from the circuit of the electronic timing device.

To attach the aforementioned accessories to the shutter housing 1 and connect them to the electronic switching device, a plug receptacle provided with 3 plug pins 45, 46 and 47 is disposed on the cylindrical wall of shutter housing 1. The contact pin 45 is in electrical connection with the two switches $S_1$ and $S_2$, contact pin 46 is connected with the fixed resistors 37, and contact pin 47 is in electrical connection with the contact plate 42. Furthermore, in the area of the plug receptacle 45 to 47, at the inside wall of shutter housing 1, a contact clip 49 is disposed which is connected to the body of shutter housing 1 at 50. For the purpose of disconnecting the capacitor $C_v$ from the base of control transistor $T_1$, a switch $S_3$ is provided which is influenceable by the time preselector 39. This switch $S_3$ is influenceable by protrusion 39b formed at the selector and by a pin 52 located in its range of motion thereof and guided so as to be axially movable so that the switch $S_3$ is automatically moved out of the contact-making position as soon as the time preselector is set to the A position.

A design embodying an example of an accessory attachable to the electronic timing device and equipped with a photoresistor 54 for the purpose of automatic exposure time formation is schematically illustrated in FIGS. 4 and 5. Disposed in housing 55 of this accessory is a capacitor $C_e$ which, in case the shutter is set to the "A" position, takes over the function of capacitor $C_v$ provided in the circuit of the electronic timing device. Attached to housing 55 by means of a three-polar plug connection 58 is battery 57, expediently accommodated in a separate housing 56, whose contacts have the same configuration as those of plug receivers 45 to 47. Thus, advantageously battery housing 56 can also be attached directly to shutter housing 1 when required. Connected to housing 55 by means of a two-polar plug connection 59 is the photoresistor 54. To make it possible to attach the accessory, as shown in FIG. 4, to the shutter housing 1 and thus establish an electrical connection between the accessory and the electronic circuit of the shutter, a plug 61 is provided. The plug 61 has, besides two contact points 62 and 63 designed as sleeves and serving to supply voltage, an additional contact point 64, likewise designed as a sleeve and connecting both the photoresistor 54 and the capacitor $C_e$ to the circuit of the electronic timing device. In addition, plug 61 carries a contact pin 66 which is so designed that when plugging the plug into the plug receptacle 45 to 47 provided at shutter housing 1, it makes contact with clip 49 and body 50 as it enters the interior of the shutter housing. The purpose of this structure is to establish an electrical connection between the capacitor $C_e$ and the body of the shutter housing 1. However, this occurs only when shutter housing 1 is connected to the minus potential of voltage source 57 by means of the switch $S_1$ which is automatically actuated upon releasing the shutter. The connection of the capacitor $C_e$ with the plus terminal of the battery 57 is made via photoresistor 54. For the consideration of exposure factors such as f-stop and film sensitivity, a shading device (not shown) may be employed so that it precedes the photoresistor 54.

In principle, the embodiment of a design of an accessory shown in FIG. 1, attached to the housing, coincides with the accessory shown in FIG. 4 and described above. With respect to the accessory of FIG. 1, a further development is realized in that exposure factors such as f-stop, film sensitivity and the like can be put in electrically. To accomplish this, several capacitors $C_e'$ are used instead of a single capacitor $C_e$ and a contact plate 70 is assigned to each capacitor $C_e'$. One of the capacitors $C_e'$ can be included at any one time in the circuit of the electronic timing device by means of a contact slide 71 pivoted in housing 68. To set the contact slide 71 to one of the capacitors $C_e'$, a selector switch 72, 73 of a two-part design that rotates with the slide is provided. One part 72 of the selector switch shown in FIG. 2 can be designed so as to consider the film sensitivity, while the other part 73 puts in the f-stop. Moreover, a battery 57' is accommodated in the housing 68, and here, as in the design according to FIG. 4, the photoresistor 54' is attached to housing 68 by means of a two-polar plug connection 59'. Since, for the remainder, this plug serving to connect the accessory coincides with the one shown in FIG. 4, its components have been given the same reference marks, except that prime marks (') were added.

FIGS. 6 to 8 illustrate another accessory attachable to the electronic time forming device of the shutter. With this accessory, the exposure time of the shutter can be set so as to be variable by setting the time preselector 39 to the setting marked EXT. This instrument, described and illustrated to make the significance of the EXT setting understandable, comprises a combination of resistors formed essentially of a number of resistors 76 and a variable resistor 77. Accordingly, the resistor combination is so designed that the jumps existing between the various resistance valuses are bridgeable by the additional variable resistor 77. To connect the instrument to the plug receptacle 45 to 47 provided at the shutter side, a three-polar plug 78 is provided having plug sleeves 85 to 87 for electrical connection to the various components of the instrument. Besides the resistors 76 and 77 there is in the housing 75 a battery 80 serving to supply current to the electronic timing device when the instrument is attached.

As may be seen particularly from FIGS. 7 and 8, in order to set the instrument it is equipped with a setting disk 81 and a setting knob 82 adjustable in relation thereto. Setting disk 81 acts upon a contact slide 83, by means of which one of the resistors 76 can be included in the circuit of the electronic switching device. Setting knob 82 is connected to a contact slide 84 for the purpose of adjusting the variable resistor 77 which is in series. One terminal each of the battery 80 is connected to contact sleeves 85 and 86, respectively, both of which are assigned to contact pins 45 and 46 of the plug receptable 45 to 47 at the shutter side. Resistors 76 and 77, which are in series, are connected to sleeve 87 of plug 78.

The operating mode of the above described electronically controlled shutter arrangement, supplemented by the various accessories, is detailed as follows:

(1) Taking pictures with preselected exposure time

The exposure time is set by means of the time preselector 39 provided at shutter housing 1, for which purpose it is set so as to oppose the desired exposure time value of scale 41. During this setting process, contact slide 40 touches a contact 38, assigned to that resistor which corresponds to the desired time value. Unless this has already been done, the housing 56 accommodating battery 57 must be attached to the plug receptacle 45 to 47, expediently without an accessory. However, it is also possible to use this instrument with the power source illustrated in the device of FIGS. 6 to 8, serving to set a variable time and equipped with a battery 80. Further, one of the two accessories shown in FIGS. 1 and 2 or FIGS. 4 and 5, respectively, could be attached in their entirety and battery 57' or 57, respectively, could be used as power source because, from a functional standpoint, photoresistors 54' or 54, respectively, are separated from the electronic circuit during the time setting process. It should be noted that, in setting mark 39a of time preselector 39 to an exposure time value of scale 41, the contact breaker switch $S_3$ is closed which presupposes that capacitor $C_v$ is included in the circuit of the electronic switching device.

When release plunger 20 is actuated, the winding and release member 17 turns clockwise. This action closes contact switch $S_1$ due to the rotation of the actuating lever 24, locking lever 34 is made to rest against the circumference of the shutter blade actuating ring 3, and armature 26 is made to contact electromagnet 28. Another consequence of the rotary motion of winding and release member 17 is a shifting of the thrust pawl 14 and, hence, the transfer of drive lever 7 into a wound position, whereby the intermediate lever 11 remains in its assumed position for the time being. When switch $S_1$ is closed, the transistor $T_2$ is activated and builds up a magnetic field in the electromagnet 28 thereby holding the armature 26. While the actuating lever 24 is thereby held in locking position, locking lever 34 rests against actuating ring 3. At the end of the winding process, the thrust pawl 14 disengages, causing the drive lever 7 to perform a rotary return motion. Due to transport pawl 10 and intermediate lever 11 engaging ring 3, the shutter blades 2 are first transferred into open position. When this position is reached, the locking lever 34 positions itself in front of the edge 3b of the actuating ring 3 and thus blocks the further run-off motion of the mechanical drive system.

Upon the start of the movement of the actuating ring 3, contact switch $S_2$ reverses, thus causing capacitor $C_v$ to charge. Besides this, the electronic switching device is additionally connected to the battery via a contact ($S_2$ lower pin) parallel to the switch $S_1$. When the capacitor $C_v$ has reached the base potential of the control transistor $T_1$ assigned to it, the latter becomes current-carrying. At that moment, due to the feedback of the two transistors $T_1$ and $T_2$, the current in control transistor $T_1$ increases rapidly while the transistor $T_2$ and the electromagnet 28 become currentless. The actuating lever 24 now returns into its normal position under the effect of the return spring 25, whereby the locking lever 34 disengages from the actuating ring 3 which, in turn, transfers the shutter blades 2 back into their closed position. During the return motion of the actuating lever 24, switch $S_1$ opens automatically while the switch $S_2$ is transferred again into the contact making position shown in FIG. 1 by the shutter blade actuating ring 3, in which position the capacitor $C_v$ discharges.

(2) Taking pictures with light-controlled, automatic exposure time formation

For this purpose, either the accessory model shown in FIGS. 4 and 5 or the instrument as shown in FIG. 1, equipped with several capacitors $C_e'$ can be attached to the plug receptacle 45 to 47 of shutter housing 1. Of the automatic accessories shown in the drawings, the one shown in FIG. 1 will be chosen if it is necessary to put the exposure factors such as f-stop and film sensitivity showing at the shutter into the circuit of the electronic timing device directly.

Since the exposure time formation itself is to be automatic, i.e. depending on lighting conditions, mark 39a of the time preselector 39 is to be moved opposite mark A. As already explained in the foregoing, this setting process causes an interruption of the switch $S_3$, and the slide 40 disposed on the selector moves into the contact-making position with the contact plate 42. The consequence of this setting process is that the capacitor $C_v$ of the electronic timing device is now switched off and the photoresistor 54 or 54', forming parts of the accessory, is included in the circuit of the electronic timing device instead of a resistor 37. When attaching the plug 61 or 61' in the contact pin 66 or 66', electrically connected to the capacitor $C_e$ or the capacitors $C_e'$, makes contact with the body potential 50 of shutter housing 1. The resistor-capacitor members of the electronic timing device are thus formed by the photoresistor 54 or 54' and the switched-on capacitor $C_e$ or capacitors $C_e'$ of the accessory. This means in turn that the exposure time showing as a result of the function of the electronic time formation corresponds to the ohmic value of the photoresistor 54 or 54' which depends on lighting conditions. Since the capacitor $C_e$ or $C_e'$ is connected to the battery 57 or 57', respectively, via the photoresistor 54 or 54', respectively, only when the plug 61 or 61' is plugged in, the capacitor is prevented from charging for the time being. Only when the actuating plunger 20 causes the switch $S_1$ to close is the capacitor connected to the minus terminal of the battery 57 or 57' via the body connecting point 50. But as soon as the actuating ring 3 start running, the reversal of the switch $S_2$ causes the capacitor $C_e$ or $C_e'$ to charge as a function of the resistance value of the photoresistor 54 or 54'. The further functional run-off of the electronic timing device continues in the manner already described above.

(3) Taking pictures with continuously variable exposure time setting

When importance is attached to extreme precision with regard to exposure time setting, the instrument shown in FIGS. 6 to 8 is plugged into the shutter instead of the automatic accessory. This is done by plugging the three-polar plug 78 into the plug receptacle 45 to 47 at the housing side. Mark 39a of time preselector 39 is to be moved opposite the EXT position if this has not already been done. During this setting motion, the contact slide 40 makes contact with the contact plate 42 connected to the contact point 47. This removes the time regulating resistors 37 disposed in shutter housing 1 from the circuit of the electronic timing device, but not capacitor $C_v$ which remains in the circuit. The resistor-capacitor members are now formed by the capacitor $C_v$ and the resistors 76 and 77 disposed in housing 75 which are included in the circuit of the electronic timing device. The desired exposure time may be set by means of the setting members 81 and 82 provided at the accessory 75, whereby the slide 83 scans one of the resistors 76 and slide 84 is transferred into a certain position at the continuously variable resistor 77. The current from battery 80 is fed to the electronic switching device, on the one hand, via the sleeves 85 and 86, and on the other hand via the resistors 76 and 77, which are in series, and the sleeve 87. After the winding and releasing by means of plunger 20, the shutter runs off in the predescribed manner, controlled by the electronic timing device.

To simplify handling of the automatic accessory described under item 2, the configuration and design of this instrument could also have a transmission connection established consisting of gears or the like between the f-stop selector at the shutter side and the stop point of selector switch 72, 73 provided at the accessory when the accessory is plugged into the shutter housing. This again would obviate a subsequent transfer of the f-stop value set at the shutter side to the automatic accessory. Such an arrangement would presuppose that the plug 61',

Having thus described our invention, we claim:

1. A photographic shutter with an electronic timing device comprising time determining resistance means and capacitance means disposed on the shutter housing; a hand operable selector equipped with a slide contact connectable to said resistance means for setting various resistance values; said hand operable selector being movable to a position electrically disconnecting said resistance means and said capacitance means from said electronic timing device; and a photoresistor and a capacitor tuned to the resistance characteristic of said photoresistor mounted on housing means for attachment to said shutter housing, said hand operable selector being movable to a position electrically connecting said photoresistor and said capacitor to said electronic timing device.

2. The photographic shutter of claim 1 wherein said selector is transferable to an A position, and wherein a switch is provided in the circuit of said electronic timing device to interrupt the electrical connection between said capacitance means and a transistor of said electronic timing device, said switch being actuated when said selector is in said A position; and wherein said slide contact of said selector is positioned in contact making position with a contact plate electrically connected to said photoresistor when said selector is in said A position; and wherein said capacitor tuned to said photoresistor is connected to said electronic timing device by a separate contact pin.

3. The photographic shutter of claim 1 wherein said housing means is a separate housing for said photoresistor and a separate housing for said capacitor, and wherein said photoresistor and said capacitor are electrically connectable by means of a plug cable between said housings, and wherein said photoresistor and said capacitor are electrically connectable to said electronic timing device by another plug cable between said housing of said capacitor and a plug receptacle on said shutter housing.

4. The photographic shutter of claim 1 wherein a plurality of capacitors of differing capacity are provided in said capacitor housing means and wherein a selector switch is provided on said capacitor housing means to include one of said plurality of capacitors at a time in the circuit of said electronic timing device.

5. The photographic shutter of claim 1 wherein a plug connection is provided electrically connecting said photoresistor and said capacitor to said electronic timing device, said plug connection having first and second contact points connected to voltage source means to supply voltage to said electronic timing device, said plug connection having a third contact point electrically connecting said photoresistor and said capacitor to the circuit of said electronic timing device, and wherein said plug connection has a fourth contact point electrically connecting said capacitor to the body of said shutter housing, said shutter housing body being connected to the minus potential of said voltage source means by a switch automatically actuated when releasing said shutter.

6. The photographic shutter of claim 5 wherein said plug connection serving to connect said photoresistor and said capacitor to said electronic timing device is a four-polar design.

7. The photographic shutter of claim 5 wherein connecting points of said plug are a plurality of sleeves and a pin, and wherein said shutter housing has a complementary plug receptable for making electrical connection with said sleeves and pin of said plug.

8. A photographic shutter with an electronic timing device comprising a shutter housing; time determining resistance means and capacitance means disposed on said shutter housing; a switch in the circuit of said electronic timing device between said capacitance means and a transistor of said electronic timing device; a selector having a contact member electrically connectable to said resistance means for setting various resistance values, said selector being movable to an automatic position disconnecting said contact member from said resistance means and engaging said switch to disconnect said capacitance means; a photoresistor and a capacitor tuned to said photoresistor mounted on housing means connectable to said shutter for inclusion in the circuit of said electronic timing device, said contact member of said selector being electrically engaged with said photoresistor when said selector is in said automatic position.

9. The photographic shutter of claim 8 wherein said selector is hand operable and said contact member is a slide contact, and wherein said slide contact is in contact making position with a contact plate electrically connected to said photo-resistor when said selector is in said automatic position, and wherein said capacitor tuned to said photoresistor is connected to said electronic timing device by a separate contact pin.

10. The photographic shutter of claim 9 wherein said housing means is a separate housing for said photoresistor and a separate housing for said capacitor, and wherein said photoresistor and said capacitor are electrically connectable by means of a plug cable between said housings and wherein said photoresistor and said capacitor are electrically connectable to said electronic timing device by another plug cable between said housing of said capacitor and a plug receptacle on said shutter housing.

11. The photographic shutter of claim 9 wherein a plurality of capacitors of different capacity are provided in said capacitor housing means and wherein a selector switch is provided on said capacitor housing means to include one of said plurality of capacitors at a time in the circuit of said electronic timing device.

12. The photographic shutter of claim 8 wherein a plug connection is provided electrically connecting said photoresistor and said capacitor to said electronic timing device, said plug connection having first and second contact points connected to voltage source means to supply voltage to said electronic timing device, said plug connection having a third contact point electrically connecting said photoresistor and said capacitor to the circuit of said electronic timing device, and wherein said plug connection has a fourth contact point electrically connecting said capacitor to the body of said shutter housing, said shutter housing body being connected to the minus potential of said voltage source means by a switch automatically actuated when releasing said shutter.

13. The photographic shutter of claim 12 wherein said plug connection serving to connect said photoresistor and said capacitor to said electronic timing device is a four-polar design.

14. The photographic shutter of claim 12 wherein said connecting points of said plug are a plurality of sleeves and a pin, and wherein said shutter housing has a complementary plug receptacle making electrical connection with said sleeves and pin of said plug.

References Cited

UNITED STATES PATENTS

| | | | |
|---|---|---|---|
| 3,065,387 | 11/1962 | Dean | 95—53 XR |
| 3,348,460 | 10/1967 | Schmitt. | |
| 3,357,332 | 12/1967 | Helber | 95—53 |

JOHN M. HORAN, Primary Examiner

JOSEPH F. PETERS, JR., Assistant Examiner

U.S. Cl. X.R.

95—53